United States Patent
Fischer et al.

(10) Patent No.: US 10,059,088 B2
(45) Date of Patent: Aug. 28, 2018

(54) COLD LAMINATION WITH RADIATION

(71) Applicant: LISA DRAEXLMAIER GMBH, Vilsbiburg (DE)

(72) Inventors: Wolfgang Fischer, Dorfen (DE); Stephanie Reisinger, Munich (DE); Robert Magunia, Geisenhausen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 340 days.

(21) Appl. No.: 14/857,036

(22) Filed: Sep. 17, 2015

(65) Prior Publication Data

US 2016/0001535 A1    Jan. 7, 2016

Related U.S. Application Data

(62) Division of application No. 13/427,759, filed on Mar. 22, 2012.

(30) Foreign Application Priority Data

Mar. 22, 2011   (DE) .......................... 10 2011 005 901

(51) Int. Cl.
    *B32B 37/06*    (2006.01)
    *B32B 37/08*    (2006.01)
    (Continued)

(52) U.S. Cl.
    CPC .............. *B32B 37/08* (2013.01); *B29C 63/04* (2013.01); *B29C 65/1435* (2013.01);
    (Continued)

(58) Field of Classification Search
    CPC ............ B29C 35/1435; B29C 35/1483; B29C 35/3612; B29C 35/3684; B29C 35/3696;
    (Continued)

(56) References Cited

U.S. PATENT DOCUMENTS

| 2,407,833 A | 9/1946 | Jablonsky |
| 5,603,150 A * | 2/1997 | Assink .................... B29C 63/04 |
| | | 156/228 |

(Continued)

FOREIGN PATENT DOCUMENTS

| DE | 197 31 903 A1 | 1/1999 |
| DE | 697 00 507 T2 | 4/2000 |

(Continued)

*Primary Examiner* — Daniel McNally
(74) *Attorney, Agent, or Firm* — Finnegan, Henderson, Farabow, Garrett & Dunner LLP

(57) ABSTRACT

A process for laminating a material layer to a support including: providing the support, applying the material layer to the support, a heat-activatable adhesive being applied to s side of the material layer facing the dimensionally stable support and/or to the side of the dimensionally stable support facing the material layer, pressing the flexible material layer and the dimensionally stable support together by means of a lower dimensionally stable mold half and an upper dimensionally stable mold half, irradiating the mold halves, the support and the material layer with electromagnetic radiation, in particular with microwave radiation, high-frequency radiation or induction radiation, whereby the adhesive is activated directly or indirectly.

18 Claims, 2 Drawing Sheets

(51) Int. Cl.
*B32B 37/12* (2006.01)
*B29C 63/04* (2006.01)
*B29C 65/36* (2006.01)
*B29C 65/14* (2006.01)
*B29C 65/48* (2006.01)
*B29C 65/00* (2006.01)
*B29C 63/00* (2006.01)
*B29K 507/04* (2006.01)
*B29K 105/16* (2006.01)

(52) U.S. Cl.
CPC ...... *B29C 65/1483* (2013.01); *B29C 65/3612* (2013.01); *B29C 65/3684* (2013.01); *B29C 65/3696* (2013.01); *B29C 65/487* (2013.01); *B29C 65/4835* (2013.01); *B29C 65/4845* (2013.01); *B29C 66/301* (2013.01); *B29C 66/81267* (2013.01); *B32B 37/06* (2013.01); *B32B 37/12* (2013.01); *B29C 63/0065* (2013.01); *B29C 63/0073* (2013.01); *B29C 65/1412* (2013.01); *B29C 65/1425* (2013.01); *B29C 65/488* (2013.01); *B29C 65/4885* (2013.01); *B29C 66/723* (2013.01); *B29C 66/8322* (2013.01); *B29K 2105/167* (2013.01); *B29K 2507/04* (2013.01); *B32B 2310/0806* (2013.01); *B32B 2605/003* (2013.01); *Y10T 428/24628* (2015.01)

(58) Field of Classification Search
CPC ............ B29C 35/4835; B29C 35/4845; B29C 35/487; B29C 66/301; B29C 66/81267; B32B 37/08; B32B 37/06; B32B 37/12
See application file for complete search history.

(56) References Cited

U.S. PATENT DOCUMENTS

| | | | |
|---|---|---|---|
| 5,785,793 A | 7/1998 | Arai et al. | |
| 5,858,163 A | 1/1999 | Wood et al. | |
| 6,051,091 A | 4/2000 | Wood et al. | |
| 6,106,665 A | 8/2000 | Wood et al. | |
| 6,471,819 B1* | 10/2002 | Bar | B29C 63/0052 118/620 |
| 6,596,122 B1* | 7/2003 | Savitski | B29C 65/1435 156/158 |
| 2004/0142273 A1* | 7/2004 | Nishida | B32B 37/0076 430/200 |
| 2004/0226648 A1 | 11/2004 | Gupte et al. | |
| 2006/0038320 A1* | 2/2006 | Straub | B29C 43/18 264/265 |
| 2006/0283544 A1* | 12/2006 | Mori | B29C 65/1635 156/272.8 |
| 2010/0038025 A1 | 2/2010 | Keite-Telgenbuescher et al. | |

FOREIGN PATENT DOCUMENTS

| | | |
|---|---|---|
| DE | 10 2007 007 617 A1 | 8/2008 |
| DE | 10 2010 002 766 A1 | 9/2011 |
| JP | 2004-276535 | 10/2004 |
| JP | 2004276535 A * | 10/2004 |
| WO | WO 2011/110623 A1 | 9/2011 |

* cited by examiner

COLD LAMINATION WITH RADIATION

CROSS REFERENCE TO RELATED APPLICATIONS

This application is a division of U.S. patent application Ser. No. 13/427,759, filed Mar. 22, 2012, which claims benefit under 35 U.S.C. § 119(a)-(d) to German application number 10 2011 005 901.6, filed Mar. 22, 2011, the entire contents of both of which are incorporated by reference herein.

BACKGROUND

1. Field

Aspects relate to a process for producing structural elements which are used in the interior of a motor vehicle (e.g., trim parts for the doors, instrument panels, steering wheels, RI central consoles, etc.). In particular, aspects relate to a process for the cold lamination of a material layer to one side of a support. In addition, aspects relate to a tool for carrying out the process and to a product produced by the process.

2. Discussion of Related Art

A process for producing a structural element for the interior of a motor vehicle such as an instrument panel includes joining two components (e.g., a material layer joined with a support) by press lamination. One phase of the press laminating process is activating the adhesive (which has already flashed off at standard temperature). The adhesive can be in the form of an aqueous dispersion, for example, and can be applied to the one or both of the components before they are joined. The material layer can be a decorative composite with or without spacer fabrics.

The components are joined and subsequently placed into a press laminating tool and compressed between two mold halves. Once a certain pressure is obtained, heat from the laminating tool is transferred from the tool to the components and, from there, into the adhesive between the components. The heat activates and crosslinks the adhesive so that it develops its adhesive and bonding properties.

A disadvantage of the described press laminating process is that the material layer/decorative substrate material is a poor conductor of heat and hinders the heat transfer into the adhesive joint. This results in longer process times (for example several minutes per joining process) as well as a higher required energy input. This is because, in the process outlined here, the energy input for activating the adhesive must take place starting from the tool and transfer through the entire structural element (the joined components).

Document DE 10 2007 001 132 A1 is known prior art. This specification relates to a vehicle seat which has a seat component with a seat heater, the seat heater having carbon nanotubes as ohmic resistance. in order to heat the seat heater, a current path is provided between electrical contacts.

Document DE 20 2008 010 669 U1 relates to a vacuum lamination process in which a heating medium effects activation of the adhesive. Heat can additionally be introduced by radiation (IR radiation, high-frequency, microwave).

DE 10 2006 055 474 A1 relates to a process for the coating of surfaces. In this known process, film systems can be joined to an object with the aid of a MR-curable adhesive by passing electromagnetic radiation in the wavelength range λ750 to 950 nm through pigmented films. The film system is provided with an adhesive layer on one side of a film substrate layer. The object to which the film system is to be bonded can optionally also be provided with an adhesive layer. Coating can also be effected by back-injection of the film. To that end, the film is preferably deep drawn in a deep-drawing tool, and plastics composition is injected onto the back of the substrate layer. Curing of the radiation-curable adhesive layer takes place according to the invention by irradiating the adhesive layer with NIR radiation through the film layer and/or through the substrate layer.

However, the process described in DE 10 2006 055 474 A1 is suitable only in the joining of structural elements which are used in the exterior field and accordingly do not have increased requirements in respect of surface quality as does an interior trim part. Explicit mention is made here of wings, (exterior) door trims, bumpers, spoilers, skirts and exterior mirrors. Furthermore, the process of DE 10 2006 055 474 A1 does not relate to a press lamination process.

SUMMARY

In order to shorten the cycle times as much as possible, after activation of the adhesive, the structural element is demolded while it is still in the warm state, although in one embodiment, cold demolding can be used in order to avoid restoring forces. In one embodiment, therefore, the structural element is cooled while it is still in the press laminating tool and appropriate pressure is still applied to the components. However, for economic reasons. it is necessary to find a balance between the quality of the structural component and as short a cycle time as possible. In one embodiment, a process for laminating a material layer to a support includes providing the support, applying the material layer to the support, wherein a heat-activatable adhesive is applied to at least a side of the material layer facing the support or to a side of the support facing the material layer. The process includes pressing the material layer and the support together by means of a lower tool half and an upper tool half and irradiating the lower and upper mold halves, the support, and the material layer with electromagnetic radiation to activate the adhesive.

The present invention relates further to an apparatus with which the process according to the invention can be carried out. In one embodiment, an apparatus for laminating a material layer to a support includes a lower tool half holding the support, an upper tool half, and an electromagnetic radiator. The lower tool half or upper tool half, or both, may have a section that is transparent for the electromagnetic radiation.

BRIEF DESCRIPTION OF THE DRAWINGS

The accompanying drawings are not intended to be drawn to scale. In the drawing, each identical or nearly identical component that is illustrated in various figures is represented by a like numeral. For purposes of clarity, not every component may be labeled in every drawing. Various embodiments of the invention will now be described, by way of example, with reference to the accompanying drawing, in which.

DETAILED DESCRIPTION

Figure 1:
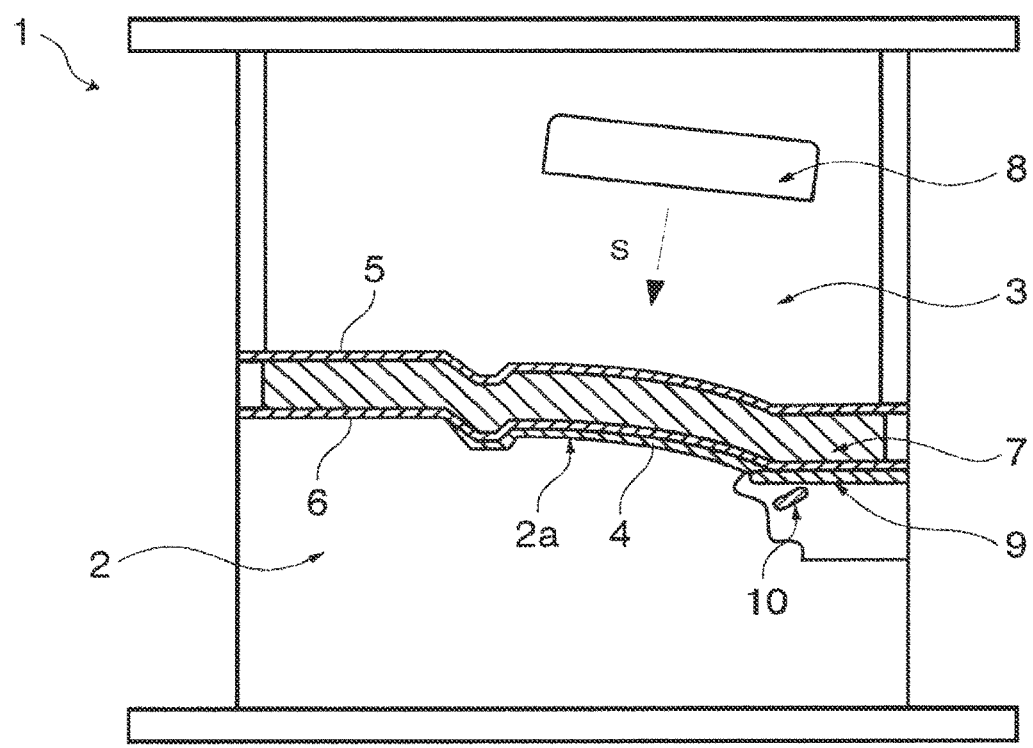
FIG. 1 is a schematic view of a press laminating tool according to one embodiment.

In one illustrative embodiment, a process may be implemented in order to solve the problems mentioned above by providing a tool which can reduce the cycle time in the production of press laminated structural elements as compared with the prior art.

Aspects of the invention are directed to activating the adhesive and subsequent drying, not by direct or indirect heat input via the tool, but by means of electromagnetic radiation which passes through the press laminating tool (e.g., microwave radiation, high-frequency radiation, or by means of induction).

In another embodiment, the cycle time may he shortened substantially. Moreover, during the activation process, excessive heat on a decorative surface component may be avoided, preventing disadvantageous effects, such as shiny spots, dents, or even burning.

In a further embodiment, a process may suppress the occurrence of temperature-induced restoring forces in the decoration because the decoration itself may not be heated. As a result, adhesion defects resulting in an edgefold region and in concave regions of a structural element may be avoided. In another embodiment, the &molding process may take place in the cold state and as a result the demolding process may be very gentle for the joined components.

In another embodiment, a process may include direct activation of an adhesive resulting in a uniform temperature distribution in the adhesive joints and considerably reducing energy consumption.

According to a further embodiment, a process may include indirect activation of an adhesive by coating a section of one of the tool halves that faces a material layer and/or a support with a layer containing graphene-like materials (e.g., fullereness, carbon nanotubes, and graphene). Alternatively, a section of the support or the material layer on a side facing the support may be coated with a layer containing graphene-like materials. Furthermore, a section of one of the tool halves, the support, or material layer may contain graphene-like materials. As a result, rather than heat the tool halves, radiation may directly heat the section coated with or containing graphene-like materials, which in turn may indirectly activate the adhesive.

In a further embodiment, a process may include direct activation of the adhesive by including graphene-like materials in the adhesive itself. As a result, the adhesive may be activated directly because the graphene-like materials already present in the adhesive may be excited by the applied radiation.

In another embodiment, a section of the upper tool half and/or of the lower tool half may be transparent for the radiation such that the radiation may pass through the tool half without exciting and heating the tool half.

The material layer may be a flexible material layer. The material layer may be a decorative layer (e.g., leather, imitation leather, foils, textile, etc.) and/or a spacer layer (haptic layer) (e.g., spacer fabrics, nonwovens, gel cushions, foams, in particular gap-filling foams). The material layer can be multi-layered. According to one embodiment, when using textiles or a spacer fabric with nonwovens, it may be preferable to coat fibers of the material layer with a layer containing graphene-like materials. As a result, radiation may excite the layer containing graphene-like materials to directly and indirectly activate the adhesive.

In one embodiment, a process may include a cooling step after the adhesive is activated. The upper or lower tool half may have cooling channels filled with a coolant that is not excited by the radiation. As a result, the cycle time may be shortened further since when the process is complete, the workpiece may be removed in a cooled state from the laminating tool. In this embodiment, it may be preferable to wait until the activated adhesive has cooled before the lower tool half and the upper tool half are moved apart.

According to a further embodiment, the duration and/or level of the energy input by the radiation are set on the basis of the type of activation of the adhesive and the amount of graphene-like materials used. In this manner, the process can be used in a variable manner for a very wide variety of workpieces to be joined, and at the same time the advantages already mentioned can be achieved.

Turning now to the figures, aspects and embodiments of the present invention are described below purely by way of example with reference to a press lamination process and a press laminating tool.

FIG. 1 shows a press laminating tool 1 including a lower tool half 2 and an upper tool half 3. The lower tool half 2 may be configured to receive and hold a support 4. Alternatively, the upper tool half 3 may be configured to receive a support 4. The support may be rigid or semi-rigid or otherwise dimensionally stable and may have a three-dimensional or two-dimensional surface contour. The lower tool half 2 and/or the upper tool half 3 may be cooled. The upper tool half 3 may include a tool shell 5, which may be dimensionally stable. Alternatively the lower tool half 2 may include a tool shell 5. The tool shell 5 may be rigid and may have a shaping contour 6. Between the shaping contour 6, the tool shell 5, and a surface 2a of the lower tool half 2 there may be a press gap in which, in the operating state, the components to be joined (e.g., a dimensionally stable support and a flexible material layer) are located. in one embodiment, cooling channels 7 may be included in the tool shell 5 through which a coolant can flow, as show in FIG. 1. Alternatively, cooling channels may be located in other areas of the upper or lower tool halves.

In one embodiment, the upper tool half 3 may include an electromagnetic radiator 8, which may emit radiation (e.g., microwave radiation, high-frequency radiation, induction radiation, infrared radiation, etc.). The direction of the radiation is indicated in FIG. 1 with the reference symbol S. Alternatively, an electromagnetic radiator 8 may be included in the lower tool half. It has been shown that the adhesive may be directly activated by different processes (optionally in combination), the activation being effected by microwave radiation, high frequency radiation or inductively.

The electromagnetic radiator 8 may be, according to one embodiment, a continuous microwave furnace. The radiation emitted by the electromagnetic radiator may pass through non-absorbing materials of the lower and/or upper tool halves 2, 3, because they may be made of materials that are not excited by the radiation passing through them (e.g., plastics material, glass, ceramic, etc.).

The radiation may also pass through the component parts to be joined (e.g., the support, decoration/composite of plastics materials) and accordingly reach unhindered the adhesive between the components. In an embodiment, the energy of the electromagnetic radiation may be absorbed by water still contained in the adhesive (generally from 5 to 40 wt. %), resulting in selective heating of the adhesive in the adhesive joints. In this embodiment, the activation and drying operation may take only a few seconds. During this time, pressure may continue to be applied in the press laminating tool 1.

Figure 2:
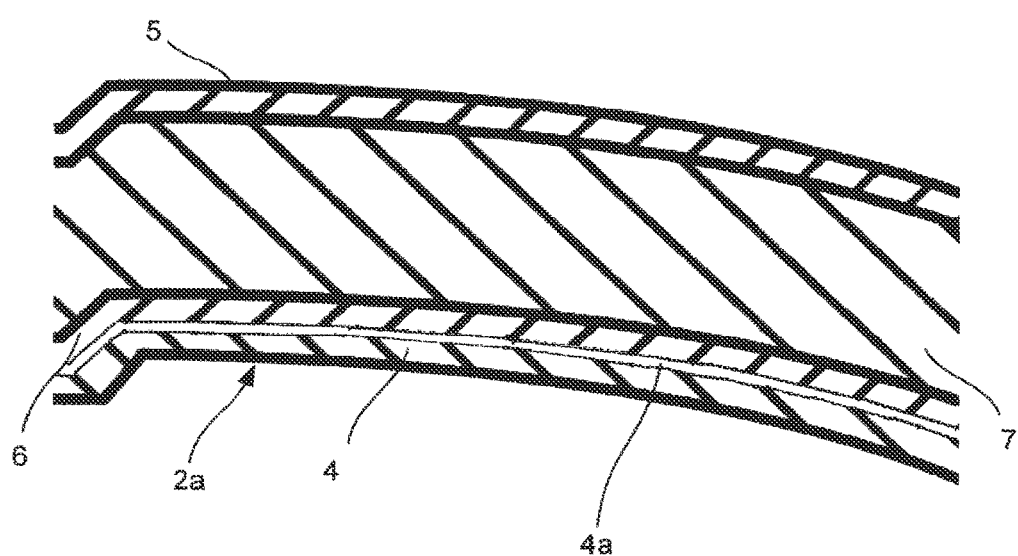
FIG. 2 is an enlarged view of a section of the press lamination tool of FIG. 1 including a tool shell, a material layer, and a support.

In another embodiment, the apparatus shown in FIG. 1 may include an edgefolding slider 9 for edgefolding a portion of the material layer 4a (shown in FIG. 2) that may project beyond the support 4 in an edge region of the support 4.

In a further embodiment, there may be a radiator 10 located near the edgefolding slider 9 to directly subject the edge region of the support to energy.

To activate the adhesive, graphene-like materials (e.g., carbon nanotubes (CNTs), fullerenes, and graphene or derivatives thereof) may be used. Accordingly, the activation of the graphene-like materials by different variants may be used in such a manner that the adhesive or the adhesive joint may be ultimately activated.

Further embodiments of the invention are mentioned below purely by way of example only (optionally in combination):

EXAMPLE A

In one embodiment, a section of the lower and/or upper tool half 2, 3 may be coated on a part-facing side with a layer containing graphene-like materials. The layer containing graphene-like materials may be a plastic material containing CNTs. The CNTs may also be incorporated into a section of one of the tool halve 2, 3 that faces the components to be joined. Radiation may be applied by the radiator 8 through one of the tool halves to activate the CNT-containing layer (heat the layer). Starting therefrom, the heat input takes place through the components to be joined to the adhesive. The adhesive is in turn activated by the heat input and accordingly develops its adhesive action.

In this embodiment, the transfer of heat through one of the tool halves, as known in the prior art in press lamination processes, is avoided. The CNT-containing layer may also be directly applied to a surface of the tool half so that direct heating can be achieved.

EXAMPLE B

In another embodiment, at least a section of the support (positioned in FIG. 1 on the lower tool half 2), may contain CNTs. As a result, heat may transfer from the support to directly activate the adhesive.

EXAMPLE C

In a further embodiment, the adhesive itself may contain CNTs, As a result, the CNTs may be excited by the radiation energy introduced directly at the point where activation of the adhesive may also take place. This results in particularly low energy consumption without dissipation losses, and a correspondingly short activation and cooling time.

EXAMPLE D

In another embodiment, a decorative underside, which is remote from the upper tool half 3 and faces the adhesive, may be coated with a CNT-containing primer or whim a corresponding preparation. In the laminating operation, the CNT-containing layer may heated by the radiation emitted by the radiator 8, and as a result transfer heat to activate the adhesive.

EXAMPLE E

In an alternative embodiment, fibers of the spacer fabric may be coated with a CNT-containing primer or with a corresponding preparation, or they may contain CNTs themselves. In the laminating operation, the CNT-containing layer may heated by the radiation emitted by the radiator 8, and as a result transfer heat to activate the adhesive, such as describe in Example D.

In the above-mentioned Examples, which may he used in combination with one another, the adhesive may be activated by means of electromagnetic radiation. This gives rise to the following advantages:

In an embodiment in which a surface of a tool half is coated with CNTs (Example A), the tool surface is heated, and indirect activation of the adhesive thereby takes place. Indirect heating of the adhesive is also achieved when the support is provided with CNTs, as mentioned in Example B. The same is true of embodiments in which the spacer fabric or the decorative layer is heated and the adhesive is thereby activated (Examples D and E).

The process according to aspects of the invention has the advantage of uniform activation and heating of the components to be joined. in addition, a reduction in the cycle time and a reduction in the energy consumption may be obtained, and the tool costs may be reduced. Because the energy input may take place directly, rather than by heating the lower or upper tool halves themselves, the energy losses may be smaller and excessive heat on a decorative surface, which later is located on the outer side in the vehicle, may be avoided. As a result, the quality of the decorative surface may not be impaired by the joining process, and temperature-induced restoring forces, which can otherwise occur in the material of the decorative layer, may be avoided.

What is claimed is:

1. A process for the lamination of a flexible material layer to a support structure, comprising:
    applying the flexible material layer to the support structure via a heat-activatable adhesive that is applied between the material layer and the support structure;
    pressing the flexible material layer and the support structure together by use of a first tool component and a second tool component, wherein at least one of the first and second tool components is configured to move toward the other tool component when pressing the flexible material layer and the support structure together;
    folding a portion of the material layer that projects from an edge region of the support structure;
    irradiating, by use of a first electromagnetic radiator disposed in the first tool component, the first and second tool components, the support structure, and the material layer with a predetermined energy level of electromagnetic radiation in order to activate the adhesive, wherein the predetermined energy level corresponds to an amount of electromagnetic radiation sufficient to activate the adhesive;
    irradiating, by use of a second electromagnetic radiator, the edge region of the support structure with a predetermined energy level of electromagnetic radiation in order to activate the adhesive; and
    cooling the adhesive by providing cooling channels in the second tool component filled with a coolant that is not excited by electromagnetic radiation.

2. The process according to claim 1, wherein the support structure has a three dimensional contour surface.

3. The process according to claim 1, wherein the irradiating comprises irradiating with one of microwave radiation, high frequency radiation, or induction radiation.

4. The process according to claim 1, wherein a surface of at least one of the first tool component, the second tool component, the material layer, or the support structure is at least partially coated with a layer containing graphene-like materials.

5. The process according to claim 1, wherein at least a section of at least one of the second tool component, the first tool component, the material layer, or the support structure contains graphene-like materials.

6. The process according to claim 1, wherein the adhesive contains graphene-like materials.

7. The process according to claim 1, wherein at least a section of at least one of the second tool component or first tool component is transparent for the radiation.

8. The process according to claim 1, wherein the material layer comprises a decorative layer.

9. The process according to claim 1, wherein the material layer comprises a spacer layer.

10. The process according to claim 1, wherein the material layer is formed at least partly of fibers, wherein the fibers are coated with a layer containing graphene-like materials.

11. The process according to claim 1, wherein the irradiating lasts less than 5 seconds.

12. The process according to claim 1, further comprising:
moving the first tool component and the second tool component apart after the activated adhesive has cooled.

13. The process according to claim 1, wherein:
at least one of the first tool component, the second tool component, the material layer, the support structure, or the adhesive contains graphene-like materials, or a surface of at least one of the first tool component, the second tool component, the material layer, the support structure, or the adhesive is at least partially coated with a layer containing graphene-like materials, and
at least one of a duration or the predetermined energy level of electromagnetic radiation is set by a type of activation of the adhesive and an amount of the graphene-like materials used.

14. The process according to claim 1, wherein an edge-folding slider, located in the second tool component, is used to fold the portion of material projecting from the edge region.

15. The process according to claim 1, wherein the second electromagnetic radiator is located in the second tool component.

16. A method for laminating a material layer to a support structure, the method comprising:
applying a heat-activatable adhesive between the material layer and the support structure;
pressing the material layer and the support structure together with a pressing tool comprising a first tool component and a second tool component, wherein at least one of the first and second tool components is configured to move toward the other tool component when pressing the material layer and the support structure together;
folding a portion of the material layer that projects from an edge region of the support structure;
irradiating, by use of a first electromagnetic radiator disposed in the first tool component, at least one of the support structure, the material layer, the first tool component, the second tool component, or the adhesive with a predetermined energy level of electromagnetic radiation in order to activate the adhesive, wherein the predetermined energy level corresponds to an amount of electromagnetic radiation sufficient to activate the adhesive, and wherein the electromagnetic radiation comprises one of microwave radiation, high frequency radiation, or induction radiation
irradiating, by use of a second electromagnetic radiator, the edge region of the support structure with a predetermined energy level of electromagnetic radiation in order to activate the adhesive; and
cooling the adhesive by providing cooling channels in the tool filled with a coolant that is not excited by electromagnetic radiation.

17. The method according to claim 16, wherein an edge-folding slider, located in the second tool component, is used to fold the portion of material projecting from the edge region.

18. The method according to claim 16, wherein the second electromagnetic radiator is located in the second tool component.

* * * * *